(12) United States Patent
Li et al.

(10) Patent No.: US 9,238,756 B2
(45) Date of Patent: Jan. 19, 2016

(54) MICRODOMAINED EMULSION POLYMERS

(75) Inventors: Kaibo Li, Shanghai (CN); Zhaohui Qu, Shanghai (CN); Robert V. Slone, Ambler, PA (US); Huixian Yang, Shanghai (CN)

(73) Assignee: Rohm and Haas Company, Philadelphia, PA (US)

( * ) Notice: Subject to any disclaimer, the term of this patent is extended or adjusted under 35 U.S.C. 154(b) by 447 days.

(21) Appl. No.: 13/158,872

(22) Filed: Jun. 13, 2011

(65) Prior Publication Data

US 2011/0313093 A1 Dec. 22, 2011

(30) Foreign Application Priority Data

Jun. 18, 2010 (CN) .......................... 2010 1 0213669

(51) Int. Cl.
| | |
|---|---|
| C09J 133/08 | (2006.01) |
| C09J 125/06 | (2006.01) |
| C08F 2/16 | (2006.01) |
| C08L 33/00 | (2006.01) |
| C09J 4/00 | (2006.01) |
| C08F 2/00 | (2006.01) |
| C08F 2/32 | (2006.01) |
| C08L 33/08 | (2006.01) |

(52) U.S. Cl.
CPC . *C09J 4/00* (2013.01); *C08F 2/001* (2013.01); *C08F 2/32* (2013.01); *C08L 33/08* (2013.01)

(58) Field of Classification Search
CPC ............ C08F 2/001; C08F 2/32; C08L 33/08; C09J 4/00
USPC .......................................... 523/201; 524/460
See application file for complete search history.

(56) References Cited

U.S. PATENT DOCUMENTS

| | | | | |
|---|---|---|---|---|
| 4,455,402 | A | * | 6/1984 | Amick et al. ................. 524/295 |
| 5,625,001 | A | | 4/1997 | Makower et al. |
| 6,552,116 | B1 | | 4/2003 | Pakusch et al. |
| 6,723,779 | B2 | * | 4/2004 | Drujon et al. ................. 524/504 |
| 2007/0158023 | A1 | | 7/2007 | Miyake et al. |

FOREIGN PATENT DOCUMENTS

| | | | |
|---|---|---|---|
| EP | 0040419 | | 11/1981 |
| EP | 0359562 | | 3/1990 |
| EP | 609756 | * | 8/1994 |
| JP | 57102976 | | 6/1982 |
| JP | 9216986 | | 8/1997 |

OTHER PUBLICATIONS

S. Kirsch, M. Kutschera, N-Y Choi, T. Frechen; Does Morphology Stick? Tailored Particle Morphologies by Swelling Polymerization Process; Journal of Applied Polymer Science, vol. 101, pp. 1444-1455 (2006); 2006 Wiley Periodicals, Inc.

T. I. Min, A. Klein, M.S. Aasser, J. W. Vanderhoff; Morphology and Grafting in Polybutylacrylate-Polystyrene Core-Shell Emulsion Polymerization; Journal of Polymer Science, Polymer Chemistry Edition, vol. 21-, pp. 2845-2861 (1983); 1983 John Wiley & Sons, Inc.

* cited by examiner

*Primary Examiner* — David W Wu
*Assistant Examiner* — Marie Reddick

(57) ABSTRACT

A microdomained aqueous emulsion polymer is provided. The polymer comprises a first domain having a Tg of from −80 to −10° C. and comprising from 80 to 100 wt % of acrylic monomer; and a non-crosslinked second domain having a Tg of from 50 to 120° C. and comprising, as polymerized unit and based on the weight of the second domain, from 50 to 100 wt % of styrenic monomer; wherein the content of the second domain ranges from greater than 6 wt % to 30 wt % of the total weight of the first domain and the second domain. The polymer is suitable for applications including adhesives and binders, especially for pressure sensitive adhesives.

5 Claims, No Drawings

MICRODOMAINED EMULSION POLYMERS

This patent application claims the benefit of the earlier filed Chinese Patent Application No. 201010213669.0 filed on Jun. 18, 2010 under 37 CFR 1.55 (a).

This invention relates generally to aqueous emulsion polymer particles which individually have a soft continuous matrix embedded with high content of multiple hard discrete domains, or literally "microdomains".

Microdomain structured polymer particles suitable for pressure sensitive adhesives are usually synthesized via swelling polymerization technique. In order to achieve the formation of polymers with high microdomain content, other synthesis processes have been attempted. With the current state of the art, it is not possible to increase the microdomain content due to the adversities in controlling the morphology in the microdomain forming stage. Restricted parameters including thermodynamic factors and kinetic factors prevent the processes to be easily applied in large batch preparation. S. Kirsch et al. discloses polymer particles consisting of poly(n-butyl acrylate) copolymerized with different types of carboxylic acids as seeds and 6 wt % styrene or 6 wt % methyl methacrylate as small hard domains synthesized by swelling polymerization process. (Does morphology stick? Tailored particle morphologies by swelling polymerization process, S. Kirsch, M. Kutschera, N.Y. Choi, T. Frechen, *Journal of Applied Polymer Science*, Volume 101, Issue 3, Pages 1444-1455) However, higher content of poly-styrenic microdomains without sacrifice of adhesive properties provided by the continuous matrix, and a stable, time effective and scarable polymerization process are still desired.

U.S. Pat. No. 5,625,001 discloses microdomained acrylic impact modifiers with less than about 40 wt % of hard methacrylate-rich microdomains in a continuous polyacrylate network. The microdomains may contain from about 20 wt % to about 45 wt % vinyl aromatic monomer and are formed within the first polymer stage using sequential or staged emulsion polymerization process. However, the second stage polymers are crosslinked domains comprising from about 0.5 wt % to less than about 5 wt % of graftlinking and/or crosslinking monomer to reach the high microdomain content, achieve the domain morphology and avoid generating of core/shell structures which will adversely affect the unique properties imparted by the domain structure. The reference does not teach or suggest that high level of microdomains can be formed without the contribution of graftlinking or crosslinking monomer.

The problem addressed by this invention is to find a high poly-styrenic microdomain content emulsion polymer with satisfactory adhesive properties provided by a soft continuous matrix in corresponding adhesive formulations.

STATEMENT OF INVENTION

The present invention is directed to an aqueous emulsion polymer comprising:

a first domain having a Tg of from −80 to −10° C. and comprising, as polymerized unit and based on the weight of the first domain, from 80 to 100 wt % of acrylic monomer; and a non-crosslinked second domain having a Tg of from 50 to 120° C. and comprising, as polymerized unit and based on the weight of the second domain, from 50 to 100 wt % of styrenic monomer;

wherein the content of the second domain ranges from greater than 6 wt % to 30 wt % of the total weight of the first domain and the second domain.

This invention is also directed to a method of preparing such aqueous emulsion polymers comprising the steps of:

a) emulsion polymerization in a reactor of a first monomer emulsion comprising from 80 to 100 wt % of an acrylic monomer; and b) continuous addition of a second monomer emulsion comprising from 50 to 100 wt % of a styrenic monomer to the reactor with cofeed of initiator;

wherein the step b) is substantively free of crosslinking monomer.

DETAILED DESCRIPTION

For the purpose of describing the components in the compositions of this invention, all phrases comprising parenthesis denote either or both of the included parenthetical matter and its absence. For example, the phrase "(meth)acrylate" means acrylate, methacrylate, and mixtures thereof, and the phrase "(meth)acrylic" used herein means acrylic, methacrylic, and mixtures thereof.

As used herein, the term "aqueous" shall mean water or water mixed with 50 wt % or less, based on the weight of the mixture, of water-miscible solvent.

As used herein, the term "polymer" shall include resins and copolymers.

As used herein, the term "styrenic" refers to a monomer containing a molecular structure of, or a polymer containing a polymerized unit of styrene or its derivatives such as, for example, methyl styrene, vinyl toluene, methoxy styrene, butyl styrene, or chlorostyrene, or the like.

As used herein, the term "acrylic" refers to a monomer containing a molecular structure of, or a polymer containing a polymerized unit of (meth)acrylic acid, alkyl (meth)acrylate, (meth)acrylamide, (meth)acrylonitrile or modified forms thereof, such as, for example, hydroxyalkyl (meth)acrylate.

In the first aspect of the invention, the aqueous emulsion polymer comprises a first domain comprising, as polymerized unit, an acrylic monomer. By "first domain" herein is meant, morphologically, a continuous phase in the polymer particle, which constitutes a matrix for other discrete phase or domain(s) to be embedded in. Suitable acrylic monomers may include, for example, one or more $C_1$-$C_{30}$ alkyl (meth)acrylate monomer, $C_5$-$C_{30}$ cycloalkyl (meth)acrylate, or $C_5$-$C_{30}$ (alkyl)aryl (meth)acrylate monomer, including, for example, methyl methacrylate, isodecyl methacrylate and low Tg acrylic monomers. Suitable low Tg monomers include but are not limited to ethyl acrylate (EA), butyl acrylate (BA), t-butyl acrylate (t-BA), 2-ethylhexyl acrylate (2-EHA), lauryl acrylate, lauryl methacrylate, cetyl (meth)acrylate, eicosyl (meth)acrylate, cetyleicosyl (meth)acrylate, behenyl (meth)acrylate, methyl acrylate, butyl methacrylate (BMA) and mixtures thereof. Preferred acrylic monomer is chosen from EA, BA, and 2-EHA.

The amount of the acrylic monomer in the first domain polymer ranges from 80 to 100 wt %, preferably from 90 to 100 wt %, and more preferably from 95 to 100 wt %, based on the dry weight of the first domain polymer. The first domain polymer may optionally comprise non-acrylic monomer such as, for example, (meth)acrylamide, (meth)acrylonitrile, or their derivatives.

The first domain in the emulsion polymer particle of the present invention has a low glass transition temperature (Tg) of from −80 to −10° C., preferably from −80 to −20° C. and more preferably from −70 to −30° C.

The Tgs used herein are those calculated by using the Fox equation (T. G. Fox, Bull. Am. Physics Soc., Volume 1, Issue No. 3, page 123 (1956)). That is, for calculating the Tg of a copolymer of monomers M1 and M2, $$\frac{1}{T_g(calc.)} = \frac{w(M_1)}{T_g(M_1)} + \frac{w(M_2)}{T_g(M_2)},$$

wherein Tg(calc.) is the glass transition temperature calculated for the copolymer, w(M1) is the weight fraction of monomer M1 in the copolymer, w(M2) is the weight fraction of monomer M2 in the copolymer, Tg(M1) is the glass transition temperature of the homopolymer of M1, and Tg(M2) is the glass transition temperature of the homopolymer of M2, all temperatures being in K. The glass transition temperatures of homopolymers may be found, for example, in "Polymer Handbook", edited by J. Brandrup and E. H. Immergut, Interscience Publishers.

The aqueous emulsion polymer of the present invention comprises a non-crosslinked second domain comprising, as polymerized unit, a styrenic monomer. By "second domain" herein is meant, morphologically, a discrete phase or domains in the polymer particle, which is embedded in the matrix of the "first domain". Suitable styrenic monomers may include, for example, styrene, methyl styrene, vinyl toluene, methoxy styrene, butyl styrene, or chlorostyrene, or mixtures thereof. Preferably, the styrenic monomer is styrene.

By "non-crosslinked domain" herein is meant a polymeric structure which is substantively free of or alternatively contains less than 0.5 wt %, based on the total weight of the second stage polymers, crosslinking monomer or graftlinking monomer as polymeric residue. By "crosslinking monomer" herein refers to di- or poly-ethylenically unsaturated monomers copolymerizable with the other monomers, wherein the ethylenically unsaturated groups have approximately equal reactivity, such as, for example, divinylbenzene (DVB); glycol di- and tri-(meth)acrylates, such as, for example, 1,4-butylene glycol dimethacrylate, 1,2-ethylene glycol dimethacrylate, and 1,6-hexanediol diacrylate; triol tri(meth) acrylates, diallyl phthalate, and the like. By "graftlinking monomer" herein refers to di- or poly-ethylenically unsaturated monomers copolymerizable with the other monomers and having sufficiently low reactivity of the unsaturated groups to allow significant residual unsaturation to remain in the polymer subsequent to its polymerization, such as, for example allyl methacrylate (ALMA), allyl acrylate, diallyl maleate, allyl acryloxypropionate and the like. By "substantively free" herein shall mean absolutely does not contain, or contain trace amount as an impurity, or below an effective amount of a substance.

The amount of the styrenic monomer in the second domain polymer ranges from 50 to 100 wt %, preferably from 80 to 100 wt %, and more preferably from 90 to 100 wt %, based on the dry weight of the second domain polymer.

The second domain in the emulsion polymer particle of the present invention has a high Tg of from 50 to 120° C., preferably from 80 to 110° C. and more preferably from 85 to 105° C.

With a view to the desired hard microdomain content and performance properties of the aqueous emulsion polymer, it is advantageous for the weight percent of the second domain to be in the range of from greater than 6 wt % to 30 wt %, preferably from 10 to 30 wt %, more preferably from 20 to 25 wt %, based on the total weight of the first domain and the second domain.

In one embodiment of the present invention, the emulsion polymer particles consist individually of two domains of aforementioned first domain and second domain.

In another embodiment of the present invention, the emulsion polymer particles consist individually of three or more domains such as, for example, further containing a third domain having a Tg of from 80 to 220° C. which is present at a level from 0.01 to 40 wt %, based on the total weight of the three domains. The third stage polymerization may be performed based on the two-stage microdomained polymer particle to form another type of domain embedded in the first stage polymer or constitutes a shell structure to the two-stage polymer particle. It is contemplated that the additional stage(s) polymer may also introduce microdomains, which is designed according to potential application requirements, such as, for example, as impact modifier to plastics. If present, these additional domain(s) can be formed from acrylic monomers, styrenic monomers or functional monomers, such as, for example, aforementioned crosslinking monomers or graftlinking monomers.

The average particle diameter of the emulsion polymer particles is from 50 to 600 nanometers, preferably from 150 to 550 nanometers, as measured by a BROOKHAVEN™ Model BI-90 Particle Sizer, supplied by Brookhaven Instruments Corporation, Holtsville, N.Y.

A second aspect of the invention provides a method of preparing the aqueous emulsion polymers comprising the steps of:

a) emulsion polymerization in a reactor of a first monomer emulsion comprising from 80 to 100 wt % of acrylic monomer; and b) continuous addition of a second monomer emulsion comprising from 50 to 100 wt % of styrenic monomer to the reactor with cofeed of initiator;

wherein the step b) is substantively free of crosslinking monomer.

The polymerization techniques used to prepare aqueous emulsion-polymers are well known in the art. In the emulsion polymerization process conventional surfactants may be used such as, for example, anionic and/or nonionic emulsifiers such as, for example, alkali metal or ammonium salts of alkyl, aryl, or alkylaryl sulfates, sulfonates or phosphates; alkyl sulfonic acids; sulfosuccinate salts; fatty acids; ethylenically unsaturated surfactant monomers; and ethoxylated alcohols or phenols. The amount of surfactant used is usually 0.05% to 6% by weight, based on the weight of monomer. Either thermal or redox initiation processes may be used. The reaction temperature is usually maintained at a temperature lower than 100° C. throughout the course of the reaction. Preferred is a reaction temperature between 30° C. and 95° C., more preferably between 50° C. and 90° C. The monomer mixture may be added neat or as an emulsion in water. The first stage monomer mixture may be added in one or more additions or continuously, linearly or not, over the reaction period, or combinations thereof, whereas the second stage monomer mixture is added continuously.

Conventional free radical initiators may be used such as, for example, hydrogen peroxide, sodium peroxide, potassium peroxide, t-butyl hydroperoxide, t-amyl hydroperoxide, cumene hydroperoxide, ammonium and/or alkali metal persulfates, sodium perborate, perphosphoric acid and salts thereof, potassium permanganate, and ammonium or alkali metal salts of peroxydisulfuric acid, typically at a level of 0.01% to 3.0% by weight, based on the weight of total monomer. Redox systems using the same initiators coupled with a suitable reductant such as, for example, sodium sulfoxylate formaldehyde, ascorbic acid, isoascorbic acid, alkali metal and ammonium salts of sulfur-containing acids, such as sodium sulfite, bisulfite, thiosulfate, hydrosulfite, sulfide, hydrosulfide or dithionite, formadinesulfinic acid, hydroxymethanesulfonic acid, acetone bisulfite, amines such as ethanolamine, glycolic acid, glyoxylic acid hydrate, lactic acid, glyceric acid, malic acid, tartaric acid and salts of the preceding acids may be used. Redox reaction catalyzing metal salts of iron, copper, manganese, silver, platinum, vanadium, nickel, chromium, palladium, or cobalt may be used. Chelating agents for the metals may optionally be used.

Chain transfer agents such as, for example, halogen compounds such as tetrabromomethane; allyl compounds; or mercaptans such as alkyl thioglycolates, alkyl mercaptoalkanoates, and $C_4$-$C_{22}$ linear or branched alkyl mercaptans may be used to lower the molecular weight of the emulsion polymer and/or to provide a different molecular weight distribution than would otherwise have been obtained with any free-radical-generating initiator(s). Chain transfer agent(s) may be added in one or more additions or continuously, linearly or not, over most or all of the entire reaction period or during limited portion(s) of the reaction period such as, for example, in the kettle charge and in the reduction of residual monomer stage. Chain transfer agents are typically used in the amount of 0 to 5 wt %, based on the total weight of monomer used to form the aqueous emulsion polymer. A preferred level of chain transfer agent is from 0.01 to 1.0, more preferably from 0.02 to 0.4 and most preferably from 0.05 to 0.2 mole % based on the total number of moles of monomer used to form the aqueous emulsion polymer.

The confirmation of the desired morphology of the emulsion polymer particles can be made by either examination of the polymer particles directly, by casting a film with minimal heat history and then examining the film, or examining a molded part. The samples can be selectively stained to highlight the styrenic groups or acrylic groups; most effective is the ruthenium staining technique for styrene groups (Trent et al. Macromolecules, 16, 588 (1983)). The emulsion polymer particles of the present invention are observed having bundles of poly-styrenic domains in TEM experiments, and these bundles distribute evenly in the embedding matrix.

The microdomained emulsion polymer may be used as one component of an adhesive, especially pressure sensitive adhesive, sealant, woven or textile non-woven binder, elastomeric coating or caulk compositions, by combining the polymer with adjuvants such as, for example, tackifiers, pigments, emulsifiers, coalescing agents, buffers, neutralizers, thickeners or rheology modifiers, humectants, wetting agents, biocides, plasticizers, antifoaming agents, colorants, waxes, and anti-oxidants.

The emulsion polymer particle and the morphology described in this invention demonstrate significant advantage of cost saving in raw materials due to the incorporating of from greater than 6 wt % to 30 wt % of cheaper styrenic domains in the particle. Compared with those polymer emulsions which contain pure butyl acrylate microdomains, the cost can be reduced from 5 to 15%. Having 6 wt % or lower content of the styrenic domains in the polymers does not result in satisfactory cost reduction, despite of their comparable or slightly better performances as pressure sensitive adhesives than that of the present polymers. Having more than 30 wt % of styrenic monomer is prone to cause safety problem in plant handling, which is observed in the inventors' laboratory operation. Additionally, the hard domains are observed to significantly improve the shear resistance of the adhesive materials in high content levels such as around 30 wt %. Furthermore, as known in the art, the more polystyrenic domains embedded in the polymer particle, the more hydrophobicity they contributes to the particle, which significantly improves the water resistance of the emulsion polymer as adhesive material.

In the present specification, the technical features in each preferred technical solution and more preferred technical solution can be combined with each other to form new technical solutions unless indicated otherwise. For briefness, the Applicant omits the descriptions for these combinations. However, all the technical solutions obtained by combing these technical features should be deemed as being literally described in the present specification in an explicit manner.

EXAMPLES

I. Raw Material Abbreviations

| Starting materials used in making Latex compound | |
|---|---|
| Compound | Chemical Nature |
| BA | Butyl Acrylate |
| 2-EHA | 2-Ethylhexyl Acrylate |
| ST | Styrene |
| EA | Ethyl acrylate |
| MMA | Methyl methacrylate |
| (M)AA | (Meth)acrylic acid |
| APS | Ammonium persulfate |
| t-AHP | Tert-amyl hydroperoxide |
| SSF | Sodium sulfoxylate formaldehyde |
| DBS | Sodium dodecyl benzene sulfonate |
| SLS | Sodium laurylsulfate |
| IAA | Isoascobic acid |
| DI water | Deionized water |
| OPP | Oriented polypropylene |

II. Test Methods

Sample preparation: samples were directly coated on corona treated fresh OPP film and dried at 110° C. for 5 minutes. The thickness of OPP film was ca. 30 μm. The coat weight was controlled ca. 21±1 g/m². Dried samples were conditioned in controlled temperature room (25±2° C., RH 60±5%) overnight before testing.

Loop Tack Test: Samples were tested on stainless steel board according to FINAT Test Method No. 9 (FINAT=Féderation Internationale des fabricants et transformateurs d' Adhésifs et Thermocollants).

Peel Strength Test: FINAT Test Method No. 2 for peel strength test at 90°.

Shear Resistance Test: FINAT Test Method No. 8 for shear resistance test.

Synthesis of Samples: For illustrative purposes only, the following examples 1-8 describe general processes for the preparation of adhesive latex with a butyl acrylate first stage and a styrene second stage. It is recognized that minor changes or alterations may be made to the reaction parameters, reactants and isolation procedures that are not disclosed herein.

Example 1

To a suitable reaction kettle equipped with stirrer, means for adding liquids, a reflux, condenser, and a nitrogen sparge line was added 590.0 g DI water and 13.7 g (solids basis) of 100 nm seed latex, which was swept by nitrogen for 10 minutes at least. Separately, the first stage monomer emulsion was prepared by combining 1401.0 g BA, 26.2 g MAA, 404.6 g DI water and 14.5 g emulsifier (22.5%, DBS). The second stage monomer emulsion was also prepared separately by combining 617.8 g styrene, 130.4 g DI water and 6.2 g DBS emulsifier.

The water of the kettle was heated to 88° C. under a nitrogen atmosphere. To the stirred kettle, 0.8 g $Na_2CO_3$ in 30.0 g DI water and 8.2 g APS in 30 g DI water were added. The first stage monomer emulsion and a solution of 1.5 g $Na_2CO_3$ in 40 g DI water were then added to the flask over 60 minutes. Reactor temperature was maintained at 88° C. A solution of 4.1 g APS in 90 g DI water was added at the beginning of first stage monomer emulsion feeding and ended after the second stage feeding.

When the feeding of first stage monomer emulsion was over, 60 g and 5 g DI water was added to rinse the monomer emulsion and $Na_2CO_3$ feed line, respectively. The reactor was cooled and at 85° C. for 10 minutes. APS feeding was maintained, and second stage monomer emulsion feeding was started. The second stage monomer emulsion was added continuously over 66 minutes, followed by 60 g and 5 g DI water to rinse the monomer emulsion and APS feed line, respectively.

During cooling the contents of the reactor to 75° C., 2.1 g of ferrous sulfate (0.5%) and 10.0 g of 60 nm polymer latex were added. Then, by holding the temperature at 75° C., 4.13 g of t-AHP (85% aq.) in 50 g DI water, and 2.22 g of SSF in 50 g DI water were added to the reactor over 90 minutes. The contents of the reactor was cooled to 50° C. and then neutralized to a pH of 7.0 to 8.0 with ammonium hydroxide. The latex was filtered through 100 mesh and 325 mesh cheesecloth to remove any gels in the emulsion. Application testing was carried out without further formulation.

Example 2

Same equipment as in Example 1 was used in synthesis of Example 2. Firstly, added 590.0 g DI water and 13.7 g (solids basis) of 100 nm seed latex, which was swept by nitrogen for 10 minutes at least. Separately was prepared the first stage monomer emulsion by combining 1503.0 g BA, 26.2 g MAA, 404.6 g DI water and 14.5 g emulsifier (22.5%, DBS). The second stage monomer emulsion was also prepared separately by combining 515.5 g styrene, 130.4 g DI water and 6.2 g DBS emulsifier.

The procedures of two stages polymerization, removal of residual monomer, neutralization and filtering were the same as Example 1.

Example 3

Same equipment as in Example 1 was used in synthesis of Example 3. Firstly, added 590.0 g DI water and 13.7 g (solids basis) of 100 nm seed latex, which was swept by nitrogen for 10 minutes at least. Separately was prepared the first stage monomer emulsion by combining 1605.1 g BA, 26.2 g MAA, 404.6 g DI water and 16.1 g emulsifier (22.5%, DBS). The second stage monomer emulsion was also prepared separately by combining 413.3 g styrene, 130.4 g DI water and 4.81 g DBS emulsifier.

The procedures of two stages polymerization, removal of residual monomer, neutralization and filtering were the same as Example 1.

Example 4

Same equipment as in Example 1 was used in synthesis of Example 4. Firstly, added 590.0 g DI water and 13.7 g (solids basis) of 100 nm seed latex, which was swept by nitrogen for 10 minutes at least. Separately was prepared the first stage monomer emulsion by combining 1708.0 g BA, 30.4 g MAA, 446.8 g DI water and 17.5 g emulsifier (22.5%, DBS). The second stage monomer emulsion was also prepared separately by combining 306.8 g styrene, 80.2 g DI water and 3.14 g DBS emulsifier.

The procedures of two stages polymerization, removal of residual monomer, neutralization and filtering were the same as Example 1.

Example 5

Same equipment as in Example 1 was used in synthesis of Example 5. Firstly, added 590.0 g DI water and 13.7 g (solids basis) of 100 nm seed latex, which was swept by nitrogen for 10 minutes at least. Separately was prepared the first stage monomer emulsion by combining 1809.0 g BA, 32.2 g MAA, 473.1 g DI water and 18.5 g emulsifier (22.5%, DBS). The second stage monomer emulsion was also prepared separately by combining 204.5 g styrene, 53.5 g DI water and 2.09 g DBS emulsifier.

The procedures of two stages polymerization, removal of residual monomer, neutralization and filtering were the same as Example 1.

Example 6, 7 and 8

Example 6, 7 and 8 was made based on the procedure of Example 1, 2 and 3 correspondingly. The differences were:

Replaced MAA monomer by equivalent weight of AA monomer in preparation of the first stage monomer emulsions.

An interstage residual monomer removal was performed by addition of 2.1 g of ferrous sulfate (0.5%), and then followed by addition of 1.03 g of t-AHP (85% aq.) in 20 g DI water and 0.55 g of SSF in 10 g DI water over 15 minutes.

The initiators of the second stage polymerization were changed to 2.06 g t-AHP in 30 g DI water and 1.11 g SSF in 30 g DI water.

Other stepwise procedures were kept as same as Example 1.

Example 9

Example 9 was made based on Example 1 except that BA was totally replaced by EHA. Other stepwise procedures were kept as same as Example 1.

Example 10

To a suitable reaction kettle equipped with stirrer, means for adding liquids, a reflux, condenser, and a nitrogen sparge line was added 597.0 g DI water, 6.90 g SLS (28%), 2.74 g ammonia solution (25%) and 3.73 g co-emulsifier, which was swept by nitrogen for 10 minutes at least. Separately was prepared the first stage monomer emulsion by combining 888.0 g EHA, 41.9 g AA, 844.4 g EA, 45.5 g Sty, 430.0 g DI water, 6.90 g SLS (28%), 4.62 g KOH and 2.50 g co-emulsifier.

The water of the kettle was heated to 83° C. under a nitrogen atmosphere. To the stirred kettle, 7.79 g APS in 26 g DI water and 70.0 g (solids basis) of 100 nm seed latex were added. The first stage monomer emulsion and a solution of 2.6 g APS in 100 g DI water were then added to the flask over 90 minutes. Reactor temperature was maintained at 83° C.

When the feeding of first stage monomer emulsion was over, 60 g and 5 g DI water were added to rinse the emulsion and APS feed line separately. Cooled and held the reaction temperature at 55° C., 3.2 g of ferrous sulfate (0.5%) was added. Then, by holding the temperature at 55° C., 2.9 g of t-BHP (70% aq.) in 10 g DI water, and 1.7 g of SSF in 10 g DI water were added to the reactor by 30 minutes.

Transferred 1680 g first stage made latex to another reactor and heated up to 85° C. During heating, the second stage monomer emulsion was prepared by combining 50.0 g DI water, 1.8 g emulsifier (22.5%, DBS) and 200 g Sty. When the temperature reached 85° C., 3.2 g of ferrous sulfate (0.5%) was added. Then, by holding the temperature at 85° C., 1.3 g of t-AHP (85% aq.) mixed with 1.4 g APS in 75 g DI water, 1.4 g of IAA in 75 g DI water and second stage monomer emulsion were added to the reactor by 90 minutes. At the end of feed, 55 g and 5 g DI water were added to rinse monomer emulsion and redox feed lines, respectively.

Cooled the contents of the reactor to 75° C., 1.7 g of t-AHP (85% aq.) in 25 g DI water and 1.00 g of IAA in 25 g DI water were added into reactor by 30 min.

After cooling to 50° C., the contents were neutralized to a pH of 7.0 to 8.0 with ammonium hydroxide. The latex was filtered through 100 meshes and 325 meshes cheesecloth to remove any gels. Followed application testing was carried out without further formulation.

Example 11

The example used Robond™ PS-90 polymer latex, produced by Rohm and Haas Company, as a commercial pressure sensitive adhesive benchmark in the performance tests of the examples.

Example 12

For examination of the microdomained polymer particle structure prepared in Examples 1-10, 10% of each of the polymer emulsions was combined with a binder emulsion of in parts by weight, butyl acrylate 52/methyl methacrylate 46.6/methacrylic acid 1.3. The samples were dried to films, cryo-sectioned, and exposed to ruthenium tetroxide vapors for 15 minutes. Then, the microdomained morphology was confirmed by STEM experiments. Results showed that bundles of poly-styrenic domains were observed in samples of Examples 1-10, and these bundles distributed evenly in the embedding matrix. The contents of the second domain in Examples 1-10 were 30, 25, 20, 15, 10, 30, 25, 20, 30 and 20, by weight percentage based on the total weight of the first domain and the second domain, which indicated that aforementioned microdomained polymer morphology were achieved when the second domain ranges from greater than 6 wt % to 30 wt %, alternatively from 10 wt % to 30 wt %.

The dried film of the emulsion polymers of above Examples 1-11 were tested firstly by finger tack. All the samples showed satisfactory finger tack performance which should be possessed by adhesive products. Especially, after the samples of Example 1-9 were coated to OPP film and attached to paper, the paper were all torn at the attached positions, which indicated the samples were satisfactory pressure sensitive adhesive materials. Further tests for pressure sensitive adhesive properties were performed according to aforementioned test methods and the test results were listed in Table 1.

TABLE 1

Evaluation of pressure sensitive adhesive properties

| Example | Content of second domain (wt %) | Loop Tack (N/inch$^2$) | Peel Strength, 90° (N/inch) | Shear Resistance (hrs, 1" × 1" × 1 kg) |
|---|---|---|---|---|
| Example 11 | 0 | 8.7 A | 5.8 A | 53 C |
| Example 1 | 30 | 13.5 A | 6.4 A | 75 C |
| Example 2 | 25 | 14.5 A | 8.5 A | 25 C |
| Example 3 | 20 | 16.2 A | 10.4 A | 20 C |
| Example 4 | 15 | 14.5 A | 8.4 A | 29 C |
| Example 5 | 10 | 18.9 A | 10.8 A | 17 C |

Note:
Failure mode key "A" for adhesive failure and "C" for cohesive failure.

The invention claimed is:
1. A polymer comprising:
   a first domain having a Tg of from −80 to −10° C. and consisting of polymerized units of acrylic monomer selected from the group consisting of (meth)acrylic acid, $C_1$ to $C_{30}$ alkyl (meth)acrylate, (meth)acrylamide, (meth)acrylonitrile, hydroxyalkyl (meth)acrylate, and mixtures thereof; and
   a non-crosslinked second domain having a Tg of from 80 to 110° C. and consisting of polymerized units of styrene or derivatives of styrene;
   wherein the content of the second domain ranges from greater than 6 wt. % to 30 wt. % of the total weight of the first domain and the second domain, and
   wherein the first domain constitutes a continuous phase in a polymer particle, which constitutes a matrix for one or more other discrete phase or domain(s) to be embedded in, and
   wherein the second domain constitutes one or more discrete domains in the polymer particle and is embedded in the matrix of the first domain.
2. The polymer of claim 1, wherein the polymerized units of styrene or derivatives of styrene comprise monomers selected from the group consisting of styrene, methyl styrene, vinyl toluene, methoxy styrene, butyl styrene, chlorostyrene, and mixtures thereof.
3. The polymer of claim 1, wherein the first domain has a Tg of from −80 to −20° C.
4. The polymer of claim 1, wherein the content of the second domain ranges from 10 wt. % to 30 wt. % of the total weight of the first domain and the second domain.
5. The polymer of claim 4, wherein the content of the second domain ranges from 20 wt. % to 25 wt. % of the total weight of the first domain and the second domain.

* * * * *